(12) United States Patent
Nygren et al.

(10) Patent No.: US 6,663,181 B2
(45) Date of Patent: Dec. 16, 2003

(54) VEHICLE SEAT PORTION

(75) Inventors: Harry Nygren, Torslanda (SE); Leo Kullman, Mullsjo (SE); Morgan Larsson, Askim (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,695

(22) Filed: Nov. 11, 2002

(65) Prior Publication Data

US 2003/0098600 A1 May 29, 2003

(30) Foreign Application Priority Data

Nov. 28, 2001 (EP) ................................ 01128279

(51) Int. Cl.⁷ ................................................ A47C 1/10
(52) U.S. Cl. .................. 297/408; 297/61; 297/391
(58) Field of Search ........................ 297/61, 403, 408, 297/391, 378.12

(56) References Cited

U.S. PATENT DOCUMENTS

| | | | |
|---|---|---|---|
| 3,065,029 A | * | 11/1962 | Spound et al. |
| 3,174,799 A | | 3/1965 | Haltenberger |
| 4,451,081 A | | 5/1984 | Kowalski |
| 4,623,166 A | | 11/1986 | Andres et al. |
| 4,761,034 A | * | 8/1988 | Saito |
| 5,181,758 A | * | 1/1993 | Sandvik |
| 5,310,243 A | | 5/1994 | Pine |
| 5,681,079 A | | 10/1997 | Robinson |
| 5,738,411 A | * | 4/1998 | Sutton et al. |
| 6,050,633 A | * | 4/2000 | Droual |
| 6,485,096 B1 | * | 11/2002 | Azar et al. |

FOREIGN PATENT DOCUMENTS

| | | | |
|---|---|---|---|
| FR | 2660260 | * | 10/1991 |
| JP | 3-5250 | * | 3/1991 |
| JP | 10297332 | | 10/1998 |
| WO | WO 94/01302 | * | 1/1994 |
| WO | WO 99/41104 A1 | | 8/1999 |

* cited by examiner

Primary Examiner—Laurie K. Cranmer

(57) ABSTRACT

A vehicle seat portion comprises a first and a second seat part a first device for accomplishing a first motion of said second seat part in relation to said first seat part, a second device for accomplishing a second motion of said second seat part in relation to said first seat part. At least one of said motions is a pivotal motion. Said first and second devices are arranged for activating said second motion upon actuation of said first motion, so as to fold said seat parts from a use-position to a stow-position.

5 Claims, 5 Drawing Sheets

VEHICLE SEAT PORTION

BACKGROUND OF INVENTION

1. Field of the Invention

The invention relates to a vehicle seat portion comprising, a first and a second seat part, a first device for accomplishing a first motion of the second seat part in relation to the first seat part.

2. Technical Background

Folding seats of different types are present in many modern motor vehicles. The folding seat arrangement is used to accommodate a large amount of baggage and long baggage by utilizing the interior of the vehicle more effectively. Quite often, the safety arrangements and the design of the prior art seats make them complicated to rearrange from a use-position to a stow-position. Such prior art seats generally require additional adjustment of neighboring equipment, such as for example a headrest and/or other seats, in order to rearrange the folding seat from a use-position to a stow-position. Many times the folding operation of such a prior art seat leads to limited comfort for passengers in neighboring seats due to the required additional adjustments.

Furthermore, it is often difficult to perform a folding operation of seats provided with a headrest or a certain shape of the backrest since particularly the headrests are occupying space in relation to neighboring installations within the vehicle compartment. This leads to an even more complicated folding operation.

There are, however, existing prior art solutions where the headrest is removed, before any folding operation, in order to facilitate the folding of the seat. This is sometimes not desirable and there is for example a risk for the headrest to be mounted in an inappropriate manner when the seat is rearranged to its use-position.

At the same time, it is desirable to provide a folding seat arrangement which allows for utilization of the greatest amount of storing space in the motor vehicle when the seat is folded in a stow-position.

It is also important, particularly for safety reasons, to provide a robust and reliable construction of a folding seat arrangement, especially when the seat is in a use-position and a passenger is occupying the seat.

SUMMARY OF INVENTION

The object of the present invention is to provide a vehicle seat portion that overcomes the above issues, and present a vehicle seat portion being easy and comfortable to handle especially during folding of said seat portion or folding of an entire vehicle seat comprising such vehicle seat portion.

A further object of the present invention is to provide a vehicle seat portion which occupies a minimum of space and thereby making available maximum storage space.

It is still a further object of the present invention to provide a vehicle seat portion being foldable in a highly self-piloting manner between a use-position and a stow-position.

These and other objects are achieved by a vehicle seat portion according to the independent claim 1. Preferred embodiments of the invention are defined in the dependent claims. According to the invention there is provided a vehicle seat portion comprising, a first and a second seat part, a first device for accomplishing a first motion of the second seat part in relation to the first seat part, a second device for accomplishing a second motion of the second seat part in relation to the first seat part, wherein at least one of the motions is a pivotal motion and, wherein the first and second devices are arranged for activating the second motion upon actuation of the first motion, so as to fold one of said seat parts from a use-position to a stow-position.

This arrangement makes it possible to accomplish an easy folding of a vehicle seat portion in a comfortable and highly self-piloting manner. Furthermore, the arrangement makes it possible to utilize a maximum of space in a vehicle compartment when the seat or seats have been folded. The vehicle seat portion may, according to the invention, be positioned in the most suitable position without any need for further adjustments of said vehicle seat portion when in a folded position.

Preferably, the second seat part is a headrest. According to a preferred embodiment the first motion is the pivotal motion. In more detail, the first pivotal motion is a motion around a first axis being located in said first seat part.

In accordance with a variant of the preferred embodiment said second motion is a second pivotal motion. In further detail, said second pivotal motion is a motion around a second axis being located in said second seat part. It is considered beneficial to achieve a stow-position of said second seat part by pivotal motions around both the first and the second axis of the vehicle seat portion. In more detail said second seat part, when in a stow-position, is pivoted at least ±45°, preferably at least ±90° and most preferred between ±130°–±230° from a use-position.

Preferably, said second seat part is pivoted towards a front part of said vehicle seat portion. This direction is indicated in the above as the positive direction (+) with respect to the pivotal motion. The use-position is here and in the following to be understood as the position of the vehicle seat portion when it is in position for a person to sit in. Directions related to the function of the vehicle seat portion is to be understood here and in the following as being described in relation to a vehicle seat portion in use-position and not necessarily depending on for example how the vehicle seat portion is mounted in the vehicle in relation to the traveling direction. It is anticipated that suitable positions of the second seat part may be accomplished by slightly modified arrangements. Such arrangements may be provided so that for example an initial transverse motion of said second seat part in relation to the extension of the first seat part in a use-position is followed by a pivotal motion. The second seat part will then assume another folded position.

Furthermore, the first and second devices are mechanically interconnected for activating said second motion upon actuation of the first motion. This arrangement will provide an efficient and controlled folding of the second seat part in a highly self-piloting manner.

According to a further preferred embodiment of the present invention the first seat part is a backrest and more preferably a backrest of a folding seat. When the first motion in such an arrangement is actuated by a second seat part trigger, which is activated by the folding of the first seat part from said use-position towards a stow-position, the entire folding of a folding seat, once initiated, is hence accomplished in a self-piloting manner. This is further described in the following section.

Preferably, the first device comprises a first latch keeping said second seat part in the use-position, the latch being releasable upon activation, initiating the first motion. Furthermore, the second device preferably comprises a second latch keeping said second seat part in said use-position, the second latch being releasable upon actuation of the first motion, initiating the second motion. The first and second latch are mechanically interconnected through a connector movably arranged in relation to a support structure of the second seat part and thus the relative motion between the support structure and the connector is used for extracting a necessary force to unlatch the second latch. The connector preferably comprises a hinged mechanism connected to the second latch, which second latch is mounted fixed in relation to the support structure. During the relative motion of the connector, in relation to the support structure of the second seat part, the second latch will be unlatched and the folding motion of the second seat part will be continued. It is preferred that the first and the second device are spring loaded in order for the folding of the vehicle seat portion to be fully accomplished.

Since the floor in the vehicle sometimes can be dirty said second seat part preferably has a dirt-repelling material on a rear side surface, which is the side of the second seat part being closest to the floor when the vehicle seat portion according to a preferred embodiment of the invention is arranged in the stow-position. The position of the second seat part will be adapted to have a clearance to the floor the risk of It is also according to the invention provided a motor vehicle having such a seat portion with the resulting advantages. It is still a further object of the present invention to enable a person to perform a transformation of the vehicle seat portion, from one position to another position, from one location in a convenient manner.

BRIEF DESCRIPTION OF DRAWINGS

A currently preferred embodiment of the present invention will now be described in more detail, with reference to the accompanying drawings.

FIG. 5b is a schematic side view of a part of a vehicle seat portion being folded according to the same embodiment of the invention as in FIG. 5a.

FIG. 5c is a schematic side view of a part of a vehicle seat portion in a stow-position according to the same embodiment of the invention as in FIG. 5a.

DETAILED DESCRIPTION

A first preferred embodiment of the invention related to a motor vehicle folding seat arrangement will be described in more detail in the following with reference to the accompanying drawings. The use-position is here and in the following to be understood as the position of the vehicle seat portion when it is in position for a person to sit in. Directions related to the function of the vehicle seat portion is to be understood here and in the following as being described in relation to a vehicle seat portion in use-position and not necessarily depending on for example how the vehicle seat portion is mounted in the vehicle in relation to the traveling direction.

Figure 1:
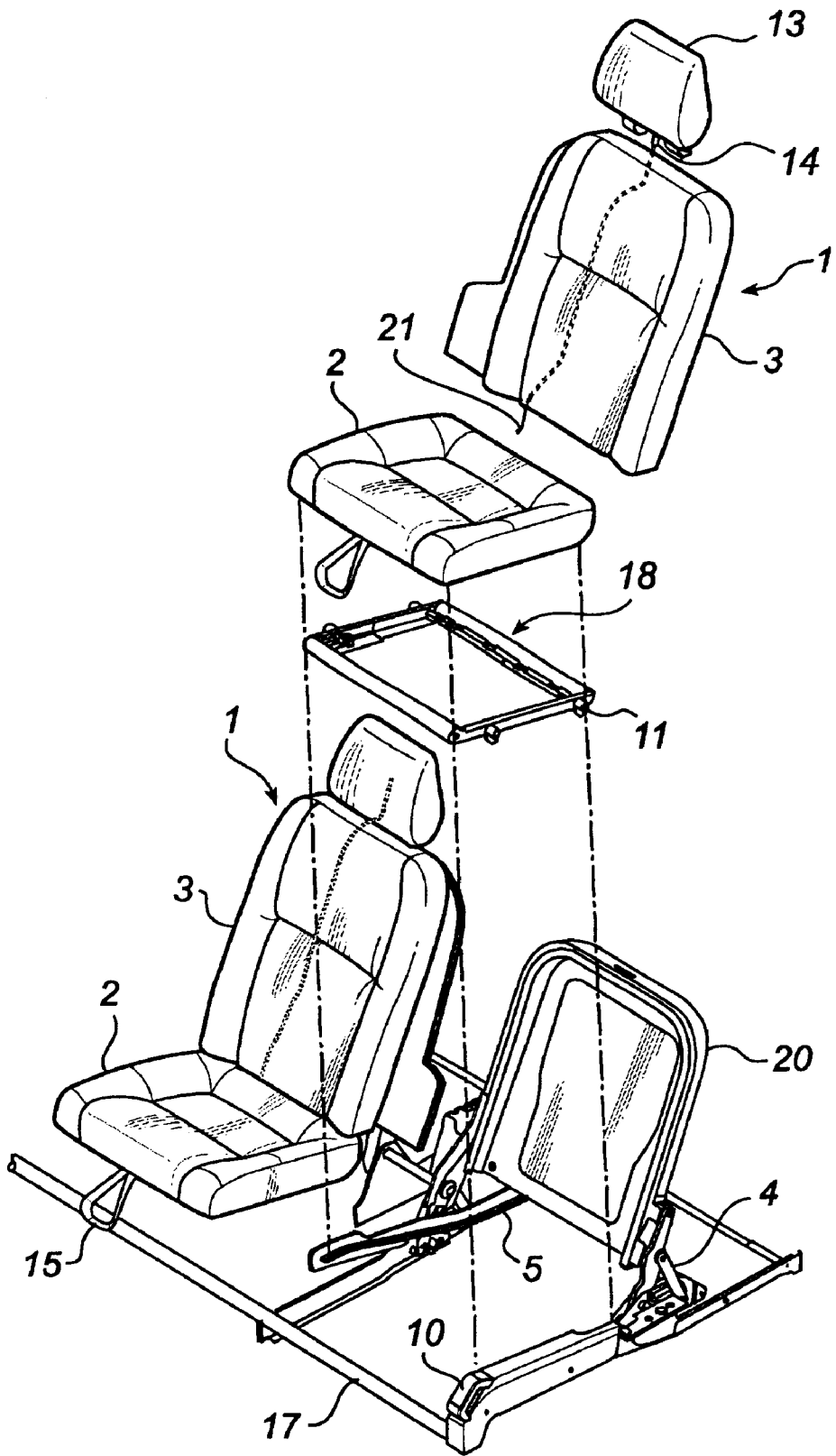
FIG. 1 is an exploded schematic perspective view of a vehicle seat according to an embodiment of the invention.

Referring now to FIG. 1, a folding seat arrangement 1 of a kind that has a use-position and a stow-position is disclosed. The use-position is here and in the following to be understood as the position of the seat when it is in position for a person to sit in. Directions related to the function of the seat is to be understood here and in the following as being described in relation to a seat in use-position and not necessarily depending on for example how the seat is mounted in the vehicle in relation to the traveling direction. The seat arrangement 1 further comprises a seat cushion 2, a backrest 3 and two pivotal mechanisms 4 for enabling folding of the backrest 3. The seat cushion 2 is movable between said use-position, and said stow-position which is situated substantially behind said backrest, leaving space for forward folding of said backrest 3.

According to a preferred embodiment of the invention the seat cushion 2 is arranged to be guided underneath the backrest 3, when moved between said use-position and said stow-position. The seat cushion is provided on a seat cushion frame 18. A guide 5 is fixed in relation to the motor vehicle structure 17 and connected to said seat cushion frame 18, such that said seat cushion 2 is guided by said at least one guide 5 between said use-position and said stow-position. The seat cushion 2 is hence movable between a pair of first pivotal mechanisms 4 holding the backrest 3. The movable connection between the seat cushion frame 18 and a guide 5 is preferably formed by a pin 11 in a groove.

Figure 2:
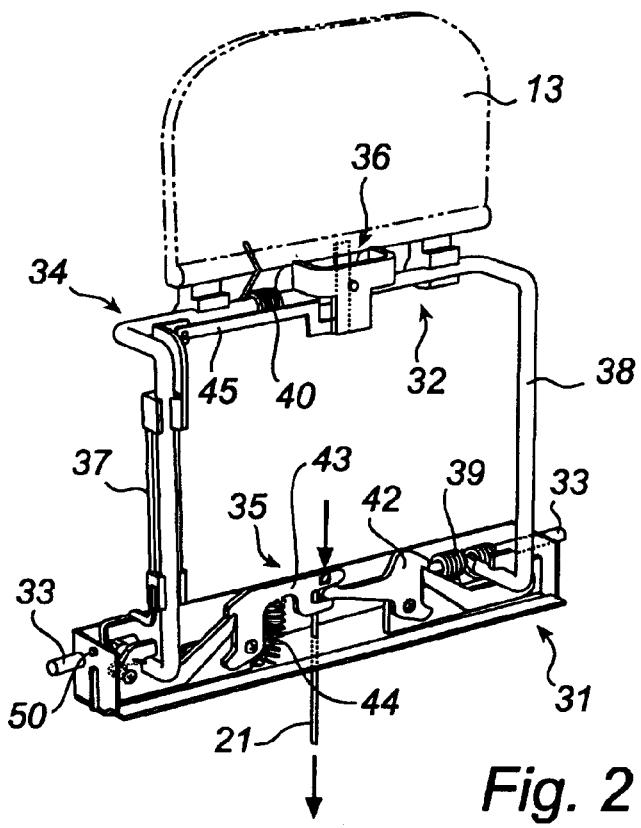
FIG. 2 is a schematic perspective view of a part of a vehicle seat portion in a use-position according to an embodiment of the invention.

Further according to the preferred embodiment and with reference to FIG. 2, the backrest 3 comprises a headrest 13. The backrest 3 has a first device 31 for accomplishing a first motion of said headrest 13 in relation to said backrest 3. The headrest 13 has a second device 32 for accomplishing a second motion of the headrest 13 in relation to said backrest 3. Said first and second devices 31, 32 are arranged for activating said second motion upon actuation of said first motion, so as to fold said headrest 13 from a use-position to a stow-position. According to a preferred embodiment said first motion is a pivotal motion. In more detail, said first pivotal motion is a motion around a first axis 33 being located in said first device 31.

In accordance with a variant of the preferred embodiment said second motion is a second pivotal motion. In further detail, said second pivotal motion is a motion around a second axis 34 being located in said second device 32.

When said first motion in such an arrangement is actuated by a second seat part trigger 21, which is preferably activated by the folding of said backrest 3 forwardly from said use-position towards a stow-position, the seat is released for folding into its stow-position.

The first device 31 comprises a first latch 35 keeping said headrest 13 in said use-position. The first latch 35 being releasable upon activation, initiating said first motion. Furthermore, said second device 32 comprises a second latch 36 keeping said second seat part in said use-position, said second latch 36 being releasable upon actuation of said first motion, initiating said second motion. Said first and second latch 35, 36 are mechanically interconnected through a connector 37 movably arranged in relation to a support structure 38 of said headrest 13. The relative motion between the support structure 38 and the connector 37 during folding is used for providing a necessary force to unlatch the second latch 36. The connector 37 preferably comprises a hinged mechanism 45 connected to said second latch 36, which second latch 36 is mounted fixed in relation to said support structure 38. During the relative motion of the connector 37, in relation to the support 38 structure of the headrest 13, the second latch 36 will be unlatched and the folding motion of the headrest will be continued.

Figure 3:
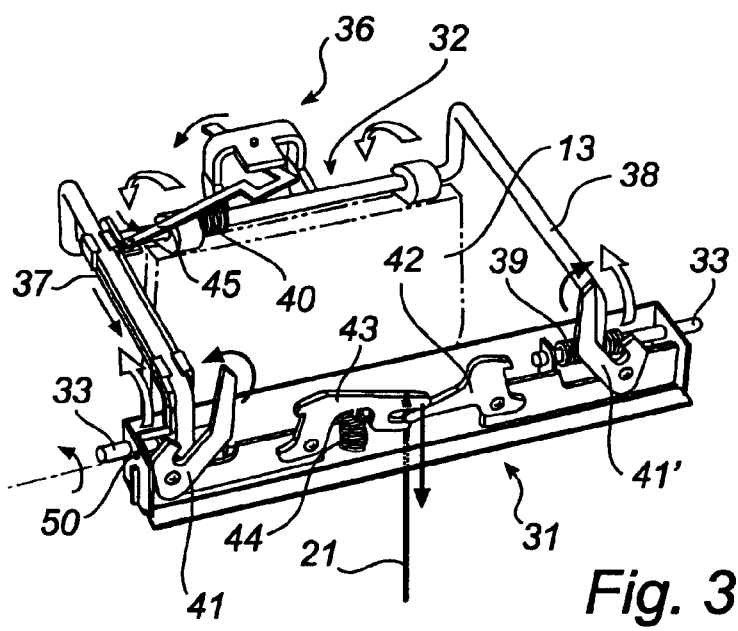
FIG. 3 is a schematic perspective view of a part of a vehicle seat portion in a stow-position according to the same embodiment of the invention as in FIG. 2.

In FIG. 3 the vehicle seat portion with the headrest 13 folded is shown. In this condition the first and second latches 35, 36 are in an un-latched condition. The first latch has been un-latched by the activation of the headrest trigger 21. The second latch has been un-latched by the movement of the hinged mechanism 45 of the connector 37a. Said first and said second device 31, 32 are spring loaded in order for the folding of the vehicle seat portion 30 to be fully accomplished. The first device 31 is provided with a first spring 39 and the second device 32 is provided with a second spring 40.

Figure 4A:
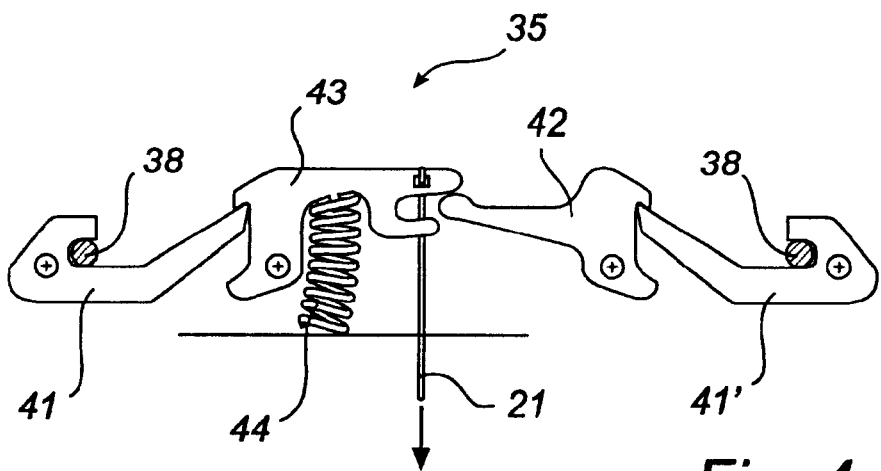
FIG. 4a is a partial front view of a first device of a vehicle seat portion in a latched condition according to an embodiment of the invention.
Figure 4B:
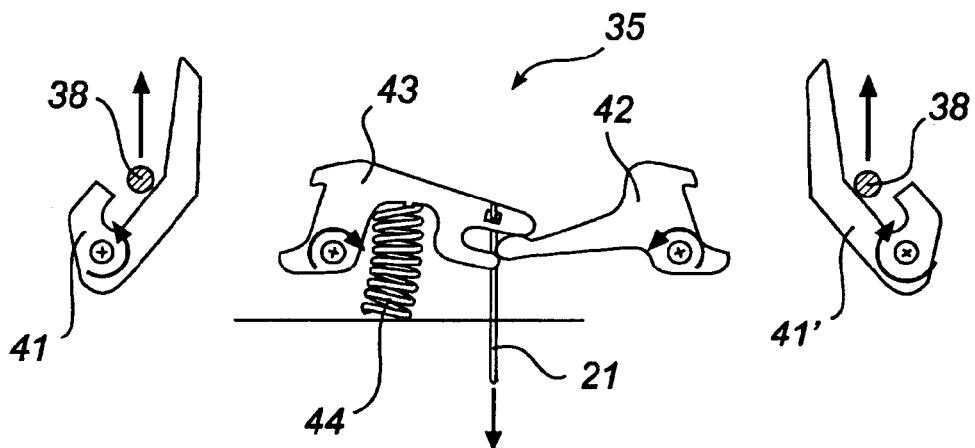
FIG. 4b is a partial front view of a first device of a vehicle seat portion according in an un-latched condition to an embodiment of the invention.

In FIGS. 4a–4b the first latch according to a preferred embodiment is shown in more detail. When in a latched condition as shown in FIG. 4a the support structure 38 is kept releasable in place by spring loaded keeping means 41, 41'. The spring loaded keeping means are arranged pivotable around each support structure 38 and kept in place by a spring-loaded latching mechanism comprising a claw part 43 and a pin part 42. The claw part 43 preferably being spring loaded with a third spring 44 providing a suitable resistance for undesirable activation of said latching mechanism.

In FIG. 4b the first latch is shown in an unlatched condition, wherein the spring loaded keeping means 41, 41' are pivoted and thus the spring loaded support structure 38 is released and free to perform the folding motion.

Figure 5A:
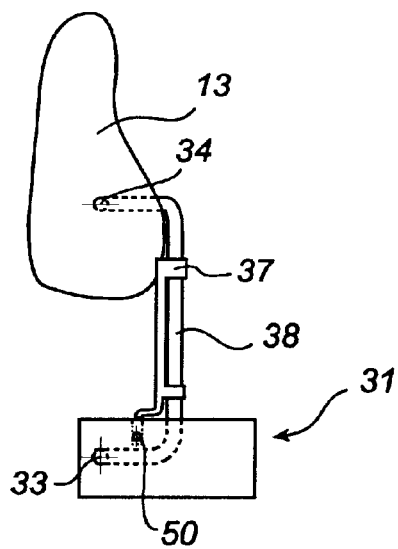
FIG. 5a is a schematic side view of a part of a vehicle seat portion in a use-position according to an embodiment of the invention.

This arrangement will accomplish a controlled folding of said second seat part in a highly automatized manner further described with reference to FIGS. 5a–3c.

Figure 5B:
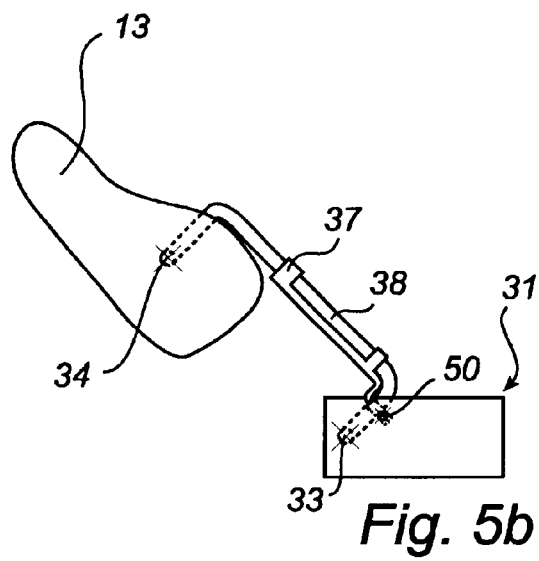
Figure 5C:
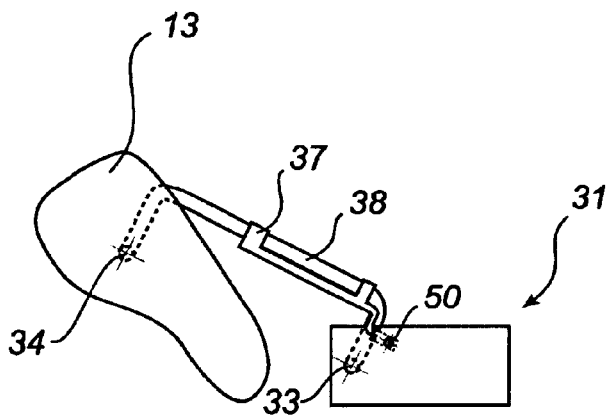

The vehicle seat portion is here shown from the side in a schematic manner. The headrest 13 is arranged to the headrest structure 38 and attached to the first device 31. The headrest structure 38 is pivotally arranged to the first device 31. The connector 38 is also pivotally arranged to said first device 31 but around a third axis 50. In FIG. 5b the folding sequence is initiated and the relative motion between the support structure 38 and the connector 37 take place. The relative motion is due to the offset between the first axis 33 and the third axis 50. During folding the relative motion is affecting the hinged mechanism, earlier described, and actuating the unlatching of the second latch 36. The folding of the headrest 13 is then further continued to a stow-position which is shown in FIG. 5c.

Figure 6:
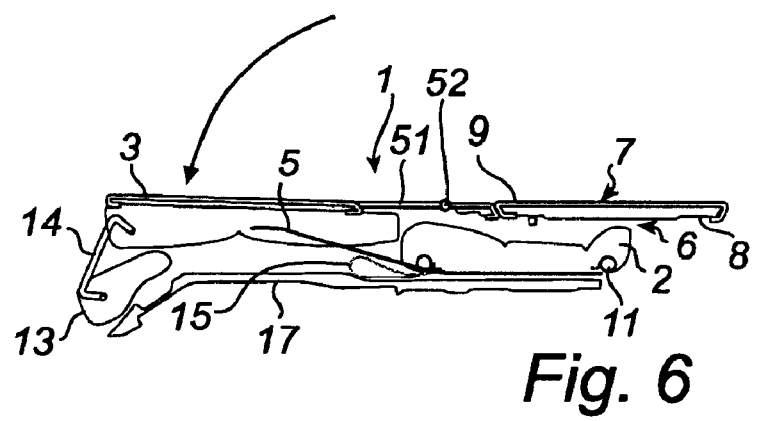
FIG. 6 is a schematic side view of a vehicle seat in a stow-position.

Since the floor in the vehicle sometimes can be dirty the headrest has a dirt-repelling material on a rear side surface, which is the side of the headrest being closest to the floor when the vehicle seat portion according to a preferred embodiment of the invention is arranged in the stow-position. The position of the headrest 13 will be adapted to have a clearance to the floor and the risk of dirt being attached to the headrest 13 will thus be minimized. This folded headrest 13 in a stow-position is shown in FIG. 6.

It is also according to the invention provided a motor vehicle having such a seat portion with the resulting advantages. It is also provided according to the present invention a vehicle seat portion enabling for a person to perform a transformation of the vehicle seat portion, from one position to another position, from one location in a convenient manner.

Figure 7:
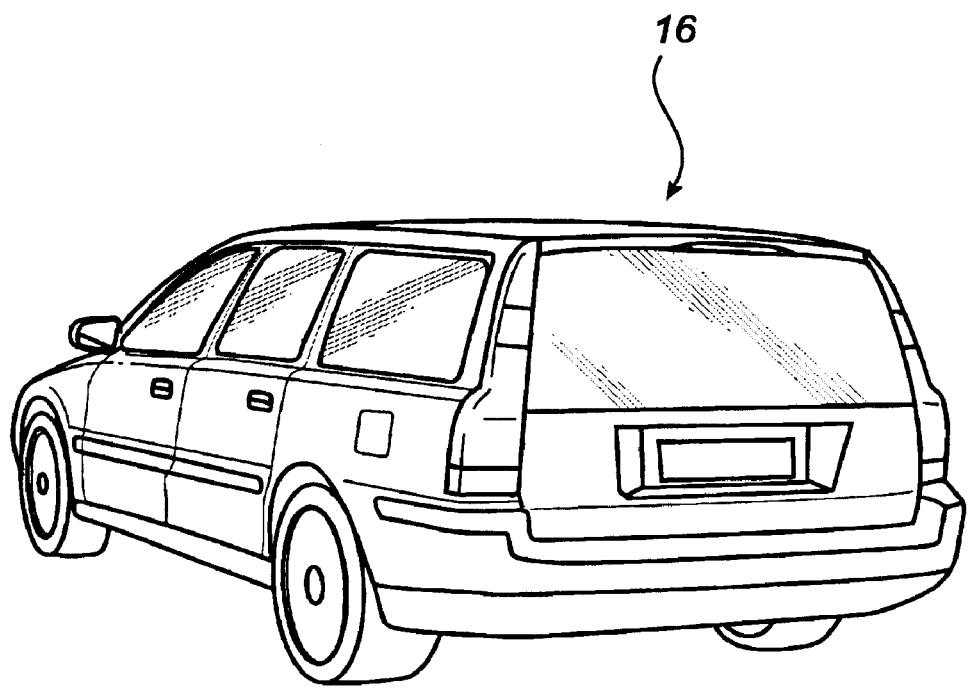
FIG. 7 is a perspective view of a motor vehicle suitable for being provided with an embodiment of the invention.

With reference made to FIG. 7 a motor vehicle 16 is shown. The motor vehicle is given as an example of suitable vehicles for using the folding seat arrangement, but the seat arrangement according to the invention may be used in other vehicles as well. Examples of other still preferred vehicles are vans, SUV's, minibuses etc.

Although the present invention has been described in connection with particular embodiments thereof, it is to be understood that various modifications, alterations and adaptations may be made by those skilled in the art without departing from the spirit and scope of the invention.

It is anticipated that suitable positions of the second seat part may be accomplished by slightly modified arrangements. Such arrangements may be provided so that for example an initial transverse motion of said second seat part in relation to the extension of the first seat part in a use-position is followed by a pivotal motion. The second seat part will then assume another folded position.

According to an alternative embodiment of the invention the folding and unfolding procedure of the seat arrangement is performed in a motorized manner.

It is further understood by a person skilled in the art that the folding of the vehicle seat portion may be performed in a motorized manner and controlled remotely.

What is claimed is:

1. A foldable vehicle seat having a backrest and a seat base that are moveable between a use-position and a stowed position, comprising:

a support structure pivotally mounted with respect to the backrest;

a headrest attached to the support structure for pivotal movement relative to the support structure;

a first latch operable to lock the support structure relative to the backrest and to selectively permit pivotal movement of the support structure with respect to the backrest;

a trigger that is actuated to selectively release the first latch;

a second latch operable to lock the headrest relative to the support structure and to cause pivotal movement of the headrest with respect to the support structure when the support structure pivots relative to the backrest;

a connector coupling the first latch and the second latch whereby when the first latch is released the relative motion between the support structure and the connector during folding of the vehicle seat from the use position to the stowed position actuates the second latch and permits pivotal movement of the headrest.

2. A foldable vehicle seat according to claim 1, wherein the support structure includes an elongated portion extending between a first pivot axis about which the support structure pivots and a second pivot axis about which the headrest pivots.

3. A foldable vehicle seat according to claim 2, wherein the connector is carried for relative slidable movement with respect to the elongated portion.

4. A foldable vehicle seat according to claim 3, wherein the elongated portion is pivotally mounted with respect to the backrest about a first axis and the connector is pivotally mounted about a second axis that is spaced from the first axis, whereby relative slidable movement of the connector is caused by movement of the support structure.

5. A foldable vehicle seat according to the claim 1 wherein actuation of the trigger also releases the backrest permitting the backrest to fold relative to the seat base.

* * * * *